No. 754,040.

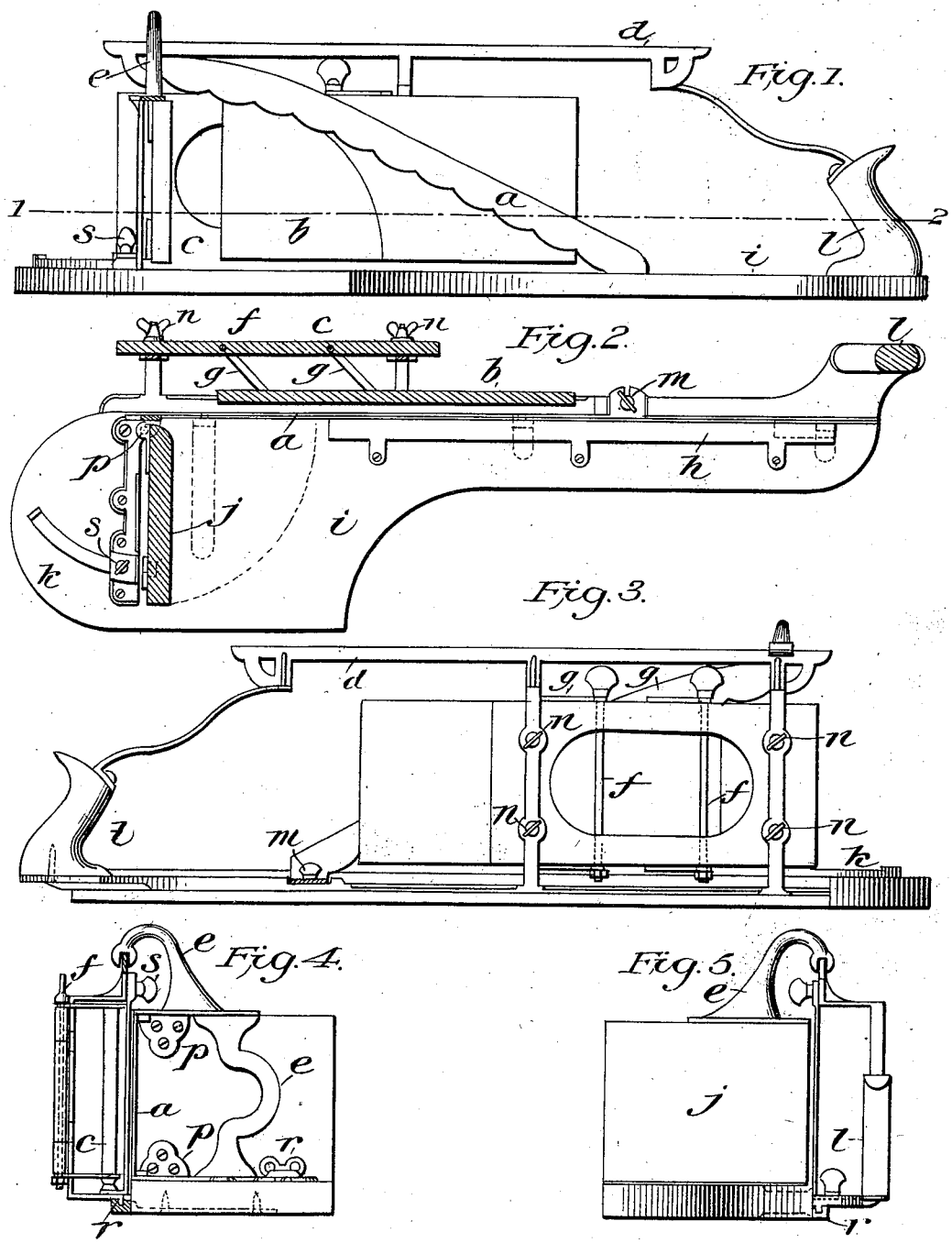

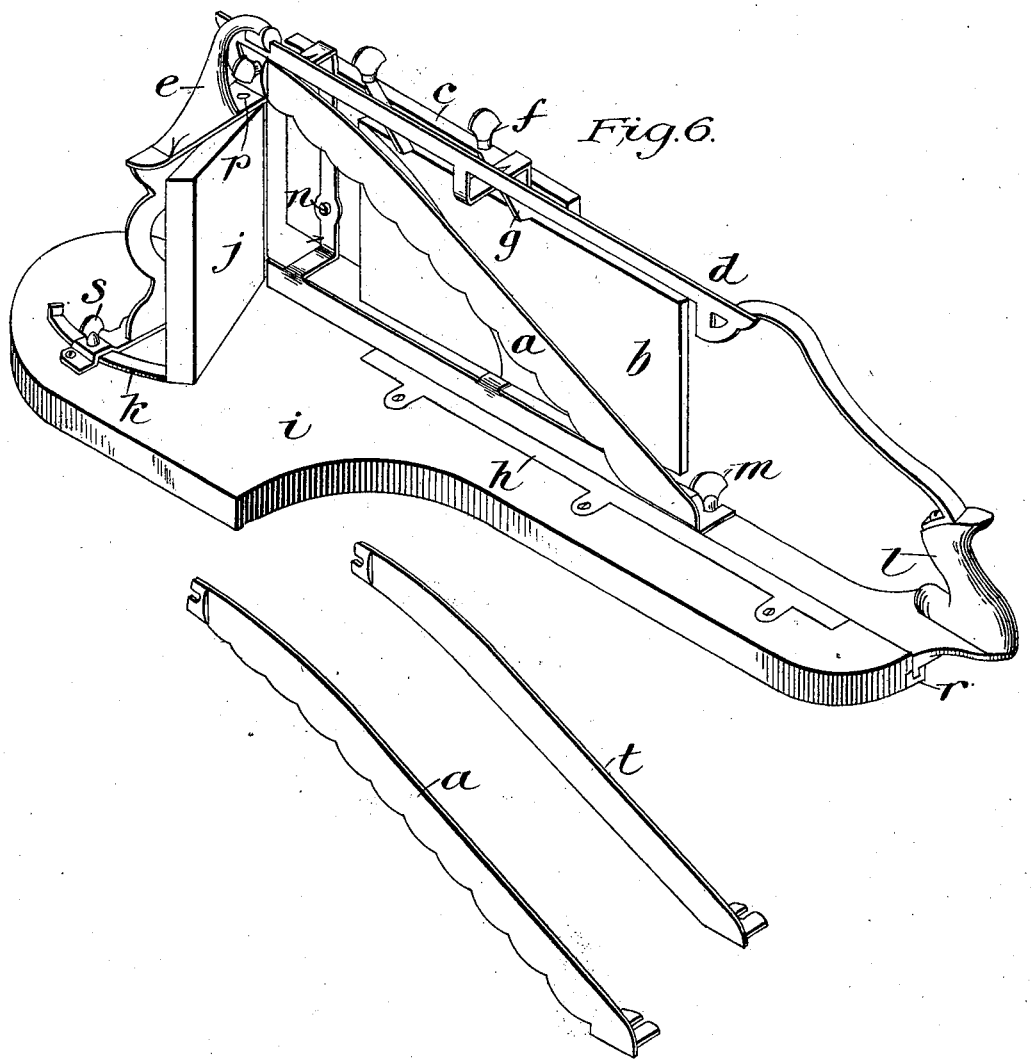

Patented March 8, 1904.

UNITED STATES PATENT OFFICE.

OSCAR BERNARD, OF SAN FRANCISCO, CALIFORNIA, ASSIGNOR, BY MESNE ASSIGNMENTS, OF ONE-FOURTH TO ARTHUR H. MANNING, OF SAN FRANCISCO, CALIFORNIA.

MACHINE FOR CUTTING BREAD.

SPECIFICATION forming part of Letters Patent No. 754,040, dated March 8, 1904.

Application filed January 9, 1903. Serial No. 138,443. (No model.)

*To all whom it may concern:*

Be it known that I, OSCAR BERNARD, a subject of the King of Great Britain, residing at No. 225 Sixth street, in the city of San Francisco, county of San Francisco, State of California, have invented a new and useful Machine, of which the following is a specification.

This invention or device is for the purpose of cutting bread, meat, (raw or cooked, without bone,) cheese, and vegetables in regular and uniform slices and of such degree of thickness, from one-sixteenth of an inch up, as may be required, with the article so cut placed or held at any desired angle.

This machine is to be operated by hand-power and is to be firmly secured to a table or bench.

The idea and plan of operating this machine is illustrated and explained by two sheets of drawings.

On Sheet I are shown one-quarter-full-size drawings marked Figures 1, 2, 3, 4, and 5, which are well calculated to explain the full workings of this machine. Fig. 2 represents a plan and section taken on line 1 and 2, as shown on Fig. 1. Fig. 1 shows a view from the operator's side of the machine, and Fig. 3 shows a view opposite to the operator's side of the machine. Fig. 4 shows a view opposite the end where the operator stands, and Fig. 5 shows end view from position of operator. Fig. 6, on Sheet II, is an isometric view of the machine from the operator's side.

Each part of the machine is indicated by a letter commencing with the letter *a*, and the same will be explained in alphabetical order.

The knife part *a* is made of steel one-third inch thick, one and one-fourth inches wide, and eighteen and one-half inches in length and has a saw-tooth or smooth edge, as may be desired, as represented by figures *a* and *t*, on Sheet II. The lower end of this member has an arm at right angles with the blade, which is slotted, so it can be adjusted and held in place by a thumb-screw, (part *m*.) The upper end of part *a* is also slotted and held by a thumb-screw, (part *s*,) this screw being shorter than part *m*.

The gage-plate to regulate the thickness of the slice is shown by part *b* and is made of hard maple one-half inch in thickness, five and one-half inches wide, and twelve inches long. This board is beveled off toward the lower end of the knife-blade (part *a*) to three-eighths inch in thickness, so as to allow the slices to fall clear from the knife after being cut. Part *b* is adjusted and held by clamps, (part *g*,) two at top and two at bottom, as shown in Fig. 2.

Part *c* is a hard-maple board one-half inch thick, five and one-half inches wide, and eleven inches long. The object of this board is to hold the thumb-screw bolts, (part *f*,) which hold part *g*. Part *c* is cut out in center, as shown, to allow a spring in the upper and lower members and is held in position by four thumb-screws, (part *n*.)

Part *d* is the steel frame that the knife (part *a*) and guide-board (part *b* and part *c*) are attached to. The upper member of this frame is three-sixteenths of an inch thick and one-half inch wide, having two vertical supports at guide-board and one curved support attached to handle, (part *l*.) The lower member of part *d* consists of a flat piece of steel three-sixteenths of an inch thick, five-eighths of an inch wide, having on one side a tongue at right angles to the flat surface. The object of this is to guide the frame (part *d*) in the slot-track, (part *r*.) This lower member of part *d* is strengthened to one-fourth of an inch in thickness under handle *l*.

Part *e* is a steel frame with top and lower members three-sixteenths of an inch in thickness and three-fourths of an inch wide, with a crane-neck top part that is to allow the top member of part *d* to slide through. This frame (part *e*) is secured to foundation-board (part *i*) with three-fourth-inch No. 9 screws and also holds in position part *k*. In the upper and lower members of part *e* are three-fourth-inch holes to admit hinges, (part *p*.)

Part *f* consists of two thumb-screw bolts one-fourth by six and one-fourth inches, having nut at bottom, and are to hold part *g* in position.

Part g consists of four clamp-bars three-sixteenths of an inch thick and three-eighths of an inch wide. These parts are fitted with holes to allow part f to pass through and are calculated to hold part b in position.

Part h is a steel guide three-sixteenths of an inch thick, five-eighths of an inch wide, having three arms with holes for three-fourth-inch screws. This member is let in flush with the top of part i and is set one-sixteenth of an inch away from knife-blade, (part a.) On the lower side of part h at either end will be a lug extending down to act as a stop for frame, (part d.) These lugs are provided with a rubber bumper one-fourth inch thick, held in place by flush-screws.

Part i is the foundation-board, which will be of hard maple one inch in thickness, seven inches wide, and thirty-one inches long.

Part j is the guide-board to hold the bread or other article against the knife (part a) and is of hard maple three-fourths inch in thickness, six and one-fourth inches wide, and five and one-half inches high. This board is secured to part p with three-fourth-inch No. 9 screws and is adjusted by part k, this being screwed to part j by r.

Part k consists of a curved member to act as a guide for part j and is held in place by thumb-screws, (part S.) Part k is secured to part j by three-fourth-inch No. 9 screws through part r.

Part l is a hard-maple handle to run the steel frame (part d) and is held in place by screws through upper and lower member of part d.

Part m is a thumb-screw to hold part a in position.

Part n consists of four thumb-screws through frame (part d) to hold part c in position.

Part p consists of two hinges with long ends one-fourth inch, to be fastened to part j with screws.

Part r is the grooved member to receive the steel frame (part d.) This part is five-eighths of an inch deep and three-fourths of an inch wide and is provided with three arms three-sixteenths of an inch thick and three-fourths of an inch wide, having holes for three-fourth-inch screws. This (part r) is secured to part a with three-fourth-inch No. 9 screws. The groove in this part is one-fourth of an inch deep and one-fourth of an inch wide.

Part s is a thumb-screw to hold the upper end of part a in position.

Part t is an alternate knife-blade, made the same as part a, but with a plain edge. It may be used instead of part a, if the operator so desires. Both knives are shown separately (part a and part t) on Sheet II directly below Fig. 6.

Having fully described my invention, what I claim as such, and desire to secure by Letters Patent of the United States, is—

A bread-cutting device comprising a base, having a grooved member, an end frame having an overhanging grooved arm secured to said base, a knife-frame sliding in the grooves of said arm and member and carrying a knife, a plate fixed to said knife-frame in a plane parallel to and outside that of the knife, a gage-board pivoted to pairs of links and threaded bolts passing through said links and said plate to clamp them together at will.

In testimony whereof I have signed my name to this specification in the presence of two subscribing witnesses.

OSCAR BERNARD. [L. S.]

Witnesses:
F. E. MEYERS,
C. E. RITTER.